(12) United States Patent
Yu et al.

(10) Patent No.: US 10,853,565 B2
(45) Date of Patent: Dec. 1, 2020

(54) METHOD AND DEVICE FOR POSITIONING TABLE IN PDF DOCUMENT

(71) Applicant: ABC FINTECH CO., LTD., Beijing (CN)

(72) Inventors: Zhou Yu, Beijing (CN); Yongzhi Yang, Beijing (CN); Xian Wang, Beijing (CN)

(73) Assignee: ABC FINTECH CO., LTD., Beijing (CN)

( * ) Notice: Subject to any disclaimer, the term of this patent is extended or adjusted under 35 U.S.C. 154(b) by 125 days.

(21) Appl. No.: 15/984,195

(22) Filed: May 18, 2018

(65) Prior Publication Data
US 2019/0294663 A1   Sep. 26, 2019

(30) Foreign Application Priority Data

Mar. 26, 2018   (CN) .......................... 2018 1 0253203

(51) Int. Cl.
*G06F 17/00*   (2019.01)
*G06F 40/177*   (2020.01)
*G06F 40/103*   (2020.01)

(52) U.S. Cl.
CPC .......... *G06F 40/177* (2020.01); *G06F 40/103* (2020.01)

(58) Field of Classification Search
CPC ............................. G06F 17/21; G06F 40/177
See application file for complete search history.

(56) References Cited

U.S. PATENT DOCUMENTS

| | | | |
|---|---|---|---|
| 6,173,073 B1 * | 1/2001 | Wang ................. | G06K 9/00449 382/171 |
| 2007/0186152 A1 * | 8/2007 | Gurcan ................. | G06F 40/103 715/209 |
| 2010/0174975 A1 * | 7/2010 | Mansfield ............. | G06F 17/211 715/227 |
| 2013/0191715 A1 * | 7/2013 | Raskovic .............. | G06F 40/177 715/227 |
| 2016/0117551 A1 * | 4/2016 | Hausmann ......... | G06K 9/00469 382/161 |

OTHER PUBLICATIONS

Yildiz et al., pdf2table: A Method to Extract Table Information from PDF files, Vienna University of Technology, 2005, p. 1-14 (Year: 2005).*

* cited by examiner

*Primary Examiner* — Andrew T McIntosh
(74) *Attorney, Agent, or Firm* — Morgan, Lewis & Bockius LLP

(57) ABSTRACT

The present application relates to a method performed by an electronic device for positioning a table in a PDF document. The method comprises the following steps: receiving the PDF document containing the table; extracting character information and line information from vector stream information of the PDF document; and positioning a table area in the PDF document according to the extracted character information and line information. The method and the device in the present application perform table area positioning based on all lines and text blocks in a page. Compared with the prior art, the method and the device have the advantages that the accuracy of the table area positioning can be greatly improved, and a foundation is provided for accurate analysis of table information.

14 Claims, 13 Drawing Sheets

| Risk Factor |
| --- |

49.94% (mainly reflected in offshore loans, the non-performing balance of the bank is 3.809 billion yuan, accounting for 26.49% of the non-performing loans and 53.06% of the foreign currency non-performing loans). The regional distribution structure of foreign currency non-performing loans is as follows.

| timing structure of non-performing loans at the end of 2001 | | regional distribution of foreign currency non-performing loans (five-level classification) | |
| --- | --- | --- | --- |
| 1997 and before | 82% | Offshore Banking Department | 53.05% |
| | | Shenzhen Management Department | 17.06% |
| 1998 | 9% | General Banking Department | 16.05% |
| | | Shanghai Branch | 5.94% |
| 1999 | 8% | Guangzhou Branch | 2.51% |
| | | Wuhan Branch | 1.63% |
| 2000 to now | 1% | Other Regions | 3.22% |

● Risk of offshore business. The bank tried to run offshore business in 1989, which has been developing continuously in the exploration, and the business volume once accounted for a certain proportion of the whole bank's business. Since 1998, due to the impact of the Asian financial crisis and changes in China's financial policies, as well as its own management problems, the quality of offshore assets has declined and the defective rate has risen.
Unit: CNY 100 million yuan

| | end of 1999 | end of 2000 | end of 2001 |
| --- | --- | --- | --- |
| loan balance of offshore department | 83.51 | 59.97 | 40.82 |
| non-performing loans in the offshore department | 55.85 | 47.67 | 38.09 |
| account for offshore loans | 66.89% | 79.50% | 93.31% |
| account for whole bank loans | 6.74% | 4.34% | 2.72% |
| reserves for offshore bad loans | 20.10 | 13.30 | 11.50 |
| reserve coverage ratio | 35.99% | 27.90% | 30.19% |

After the Asian financial crisis, the offshore business of domestic Banks was greatly affected. In 1999, the central bank decided to stop the offshore asset business. The bank has made timely adjustments to the offshore business, and has taken various measures such as clearing and reducing loans, transforming and activating the stock of assets. As of December 31, 2001, the balance of offshore loans was compressed into RMB 4.082 billion, and the balance of non-performing assets was calculated as RMB 3.446 billion according to one or two inactive statistics, with a non-performing ratio of 84.42%.According to the statistics of five levels, the balance of non-performing assets is equivalent to 3.09 billion yuan, and the non-performing asset ratio is 93.31%.Although offshore loans accounted for only 2.91% of the total bank loans, but its recovery still has a high risk. From 1998 to 2001, the total amount of non-performing offshore loans has been written off to the equivalent of 1.109 billion yuan.

FIG. 3

| Risk Factor |
|---|
| 49.34% (mainly reflected in offshore loans, the non-performing balance of the bank is 3.809 billion yuan, accounting for 26.49% of the non-performing loans and 53.06% of the foreign currency non-performing loans). The regional distribution structure of foreign currency non-performing loans is as follows |

| timing structure of non-performing loans at the end of 2001 | | regional distribution of foreign currency non-performing loans (five-level classification) | |
|---|---|---|---|
| 1997 and before | 82% | Offshore Banking Department | 53.05% |
| 1998 | 9% | Shenzhen Management Department | 17.06% |
| | | General Banking Department | 16.05% |
| | | Shanghai Branch | 5.94% |
| 1999 | 8% | Guangzhou Branch | 2.51% |
| | | Wuhan Branch | 1.63% |
| 2000 to now | 1% | Other Regions | 3.22% |

- Risk of offshore business. The bank tried to run offshore business in 1989, which has been developing continuously in the exploration, and the business volume once accounted for a certain proportion of the whole bank's business. Since 1998, due to the impact of the Asian financial crisis and changes in China's financial policies, as well as its own management problems, the quality of offshore assets has declined and the defective rate has risen.

Unit: CNY 100 million yuan

| | end of 1999 | end of 2000 | end of 2001 |
|---|---|---|---|
| loan balance of offshore department | 80.50 | 59.97 | 40.82 |
| non-performing loans in the offshore department | 55.85 | 47.57 | 38.09 |
| account for offshore loans | 66.89% | 79.50% | 93.31% |
| account for whole bank loans | 6.74% | 4.34% | 2.72% |
| reserves for offshore bad loans | 20.10 | 13.30 | 11.50 |
| reserve coverage ratio | 35.99% | 27.90% | 30.19% |

After the Asian financial crisis, the offshore business of domestic Banks was greatly affected. In 1999, the central bank decided to stop the offshore asset business. The bank has made timely adjustments to the offshore business, and has taken various measures such as clearing and reducing loans, transforming and activating the stock of assets. As of December 31, 2001, the balance of offshore loans was compressed into RMB 4.082 billion, and the balance of non-performing assets was calculated as RMB 3.446 billion according to one or two inactive statistics, with a non-performing ratio of 84.42%.According to the statistics of five levels, the balance of non-performing assets is equivalent to 3.09 billion yuan, and the non-performing asset ratio is 93.31%.Although offshore loans accounted for only 2.91% of the total bank loans, but its recovery still has a high risk. From 1998 to 2001, the total amount of non-performing offshore loans has been written off to the equivalent of 1.109 billion yuan.

FIG. 4

| Risk Factor |
| --- |

49.94% (mainly reflected in offshore loans, the non-performing balance of the bank is 3.809 billion yuan, accounting for 26.49% of the non-performing loans and 53.06% of the foreign currency non-performing loans). The regional distribution structure of foreign currency non-performing loans is as follows.

| timing structure of non-performing loans at the end of 2001 | | regional distribution of foreign currency non-performing loans (five-level classification) | |
| --- | --- | --- | --- |
| 1997 and before | 82% | Offshore Banking Department | 53.05% |
| | | Shenzhen Management Department | 17.06% |
| 1998 | 9% | General Banking Department | 16.05% |
| | | Shanghai Branch | 5.94% |
| 1999 | 8% | Guangzhou Branch | 2.51% |
| | | Wuhan Branch | 1.63% |
| 2000 to now | 1% | Other Regions | 3.22% |

- Risk of offshore business. The bank tried to run offshore business in 1989, which has been developing continuously in the exploration, and the business volume once accounted for a certain proportion of the whole bank's business. Since 1998, due to the impact of the Asian financial crisis and changes in China's financial policies, as well as its own management problems, the quality of offshore assets has declined and the defective rate has risen.

Unit: CNY 100 million yuan

| | end of 1999 | end of 2000 | end of 2001 |
| --- | --- | --- | --- |
| loan balance of offshore department | 83.51 | 59.97 | 40.82 |
| non-performing loans in the offshore department | 55.85 | 47.67 | 38.09 |
| account for offshore loans | 66.89% | 79.50% | 93.31% |
| account for whole bank loans | 6.74% | 4.34% | 2.72% |
| reserves for offshore bad loans | 20.10 | 13.30 | 11.50 |
| reserve coverage ratio | 35.99% | 27.90% | 30.19% |

After the Asian financial crisis, the offshore business of domestic Banks was greatly affected. In 1999, the central bank decided to stop the offshore asset business. The bank has made timely adjustments to the offshore business, and has taken various measures such as clearing and reducing loans, transforming and activating the stock of assets. As of December 31, 2001, the balance of offshore loans was compressed into RMB 4.082 billion, and the balance of non-performing assets was calculated as RMB 3.446 billion according to one or two inactive statistics, with a non-performing ratio of 84.42%.According to the statistics of five levels, the balance of non-performing assets is equivalent to 3.09 billion yuan, and the non-performing asset ratio is 93.31%.Although offshore loans accounted for only 2.91% of the total bank loans, but its recovery still has a high risk. From 1998 to 2001, the total amount of non-performing offshore loans has been written off to the equivalent of 1.109 billion yuan.

FIG. 5

Risk Factor 49.94% (mainly reflected in offshore loans, the non-performing balance of the bank is 3.809 billion yuan, accounting for 26.49% of the non-performing loans and 53.06% of the foreign currency non-performing loans). The regional distribution structure of foreign currency non-performing loans is as follows.

A

B

| timing structure of non-performing loans at the end of 2001 | |
|---|---|
| 1997 and before | 82% |
| 1998 | 9% |
| 1999 | 8% |
| 2000 to now | 1% |

| regional distribution of foreign currency non-performing loans (five-level classification) | |
|---|---|
| Offshore Banking Department | 53.05% |
| Shenzhen Management Department | 17.06% |
| General Banking Department | 16.05% |
| Shanghai Branch | 5.94% |
| Guangzhou Branch | 2.51% |
| Wuhan Branch | 1.63% |
| Other Regions | 3.22% |

- Risk of offshore business. The bank tried to run offshore business in 1989, which has been developing continuously in the exploration, and the business volume once accounted for a certain proportion of the whole bank's business. Since 1998, due to the impact of the Asian financial crisis and changes in China's financial policies, as well as its own management problems, the quality of offshore assets has declined and the defective rate has risen.

Unit: CNY 100 million yuan

| | end of 1999 | end of 2000 | end of 2001 |
|---|---|---|---|
| loan balance of offshore department | 83.51 | 59.97 | 40.82 |
| non-performing loans in the offshore department | 55.85 | 47.67 | 38.09 |
| account for offshore loans | 66.89% | 79.50% | 93.31% |
| account for whole bank loans | 6.74% | 4.34% | 2.72% |
| reserves for offshore bad loans | 20.10 | 13.30 | 11.50 |
| reserve coverage ratio | 35.99% | 27.90% | 30.19% |

After the Asian financial crisis, the offshore business of domestic Banks was greatly affected. In 1999, the central bank decided to stop the offshore asset business. The bank has made timely adjustments to the offshore business, and has taken various measures such as clearing and reducing loans, transforming and activating the stock of assets. As of December 31, 2001, the balance of offshore loans was compressed into RMB 4.082 billion, and the balance of non-performing assets was calculated as RMB 3.446 billion according to one or two inactive statistics, with a non-performing ratio of 84.42%. According to the statistics of five levels, the balance of non-performing assets is equivalent to 3.09 billion yuan, and the non-performing asset ratio is 93.31%. Although offshore loans accounted for only 2.91% of the total bank loans, but its recovery still has a high risk. From 1998 to 2001, the total amount of non-performing offshore loans has been written off to the equivalent of 1.109 billion yuan.

FIG. 6

| | Year 2001 | Year 2000 | Year 1999 |
|---|---:|---:|---:|
| net profit before retroactive adjustment | 912,506 | 1,207,672 | 796,559 |
| Adjustment: | | | |
| loan loss reserves (1) | 530,300 | -73,443 | -139,328 |
| Investment risk reserves (2) | - | 122,130 | 48,994 |
| aged over 90 days interest receivable | 144,269 | -350,881 | -658,021 |
| long-term bond yields | -6,657 | -145,404 | 40,887 |
| organization cost amortization | 9,296 | -13,863 | 8,733 |
| overdue tax to income tax | - | -45,203 | -31,847 |
| deferred income taxes | -229,000 | 119,000 | 276,000 |
| deferred business tax | -5,000 | 10,000 | 15,000 |
| Share of profits of associates | -16,484 | -8,266 | 21,207 |
| others | 91,890 | -17,930 | 103,601 |
| net profit after retroactive adjustment | 1,431,120 | 803,812 | 481,785 |
| net assets before retroactive adjustment | 11,464,191 | 10,556,631 | 9,949,750 |
| net assets after retroactive adjustment | 5,116,436 | 3,685,316 | 2,881,504 |

Change of cumulative influence Amount (unit: CNY thousand Yuan)

FIG. 8

| timing structure of non-performing loans at the end of 2001 | |
|---|---|
| 1997 and before | 82% |
| 1998 | 9% |
| 1999 | 8% |
| 2000 to now | 1% |

| regional distribution of foreign currency non-performing loans (five-level classification) | |
|---|---|
| Offshore Banking Department | 53.05% |
| Shenzhen Management Department | 17.06% |
| General Banking Department | 16.05% |
| Shanghai Branch | 5.94% |
| Guangzhou Branch | 2.51% |
| Wuhan Branch | 1.63% |
| Other Regions | 3.22% |

FIG. 9

| Risk Factor |
|---|

49.94% (mainly reflected in offshore loans, the non-performing balance of the bank is 3.809 billion yuan, accounting for 26.49% of the non-performing loans and 53.06% of the foreign currency non-performing loans). The regional distribution structure of foreign currency non-performing loans is as follows.

| timing structure of non-performing loans at the end of 2001 | | regional distribution of foreign currency non-performing loans (five-level classification) | |
|---|---|---|---|
| 1997 and before | 82% | Offshore Banking Department | 53.06% |
|  |  | Shenzhen Management Department | 17.06% |
| 1998 | 9% | General Banking Department | 16.05% |
|  |  | Shanghai Branch | 5.94% |
| 1999 | 8% | Guangzhou Branch | 2.51% |
|  |  | Wuhan Branch | 1.63% |
| 2000 to now | 1% | Other Regions | 3.22% |

- Risk of offshore business. The bank tried to run offshore business in 1989, which has been developing continuously in the exploration, and the business volume once accounted for a certain proportion of the whole bank's business. Since 1998, due to the impact of the Asian financial crisis and changes in China's financial policies, as well as its own management problems, the quality of offshore assets has declined and the defective rate has risen.

Unit: CNY 100 million yuan

|  | end of 1999 | end of 2000 | end of 2001 |
|---|---|---|---|
| loan balance of offshore department | 83.51 | 59.97 | 40.82 |
| non-performing loans in the offshore department | 55.85 | 47.67 | 38.09 |
| account for offshore loans | 66.89% | 79.50% | 93.31% |
| account for whole bank loans | 6.74% | 4.34% | 2.72% |
| reserves for offshore bad loans | 20.10 | 13.30 | 11.50 |
| reserve coverage ratio | 35.99% | 27.90% | 30.19% |

After the Asian financial crisis, the offshore business of domestic Banks was greatly affected. In 1999, the central bank decided to stop the offshore asset business. The bank has made timely adjustments to the offshore business, and has taken various measures such as clearing and reducing loans, transforming and activating the stock of assets. As of December 31, 2001, the balance of offshore loans was compressed into RMB 4.082 billion, and the balance of non-performing assets was calculated as RMB 3.446 billion according to one or two inactive statistics, with a non-performing ratio of 84.42%.According to the statistics of five levels, the balance of non-performing assets is equivalent to 3.09 billion yuan, and the non-performing asset ratio is 93.31%.Although offshore loans accounted for only 2.91% of the total bank loans, but its recovery still has a high risk. From 1998 to 2001, the total amount of non-performing offshore loans has been written off to the equivalent of 1.109 billion yuan.

FIG. 10

| Risk Factor |
|---|

49.94% (mainly reflected in offshore loans, the non-performing balance of the bank is 3.809 billion yuan, accounting for 26.49% of the non-performing loans and 53.06% of the foreign currency non-performing loans). The regional distribution structure of foreign currency non-performing loans is as follows.

| timing structure of non-performing loans at the end of 2001 | |
|---|---|
| 1997 and before | 82% |
| 1998 | 9% |
| 1999 | 8% |
| 2000 to now | 1% |

| regional distribution of foreign currency non-performing loans (five-level classification) | |
|---|---|
| Offshore Banking Department | 53.05% |
| Shenzhen Management Department | 17.06% |
| General Banking Department | 16.05% |
| Shanghai Branch | 5.94% |
| Guangzhou Branch | 2.51% |
| Wuhan Branch | 1.63% |
| Other Regions | 3.22% |

- Risk of offshore business. The bank tried to run offshore business in 1989, which has been developing continuously in the exploration, and the business volume once accounted for a certain proportion of the whole bank's business. Since 1998, due to the impact of the Asian financial crisis and changes in China's financial policies, as well as its own management problems, the quality of offshore assets has declined and the defective rate has risen.

Unit: CNY 100 million yuan

| | end of 1999 | end of 2000 | end of 2001 |
|---|---|---|---|
| loan balance of offshore department | 83.51 | 59.97 | 40.82 |
| non-performing loans in the offshore department | 55.85 | 47.67 | 38.09 |
| account for offshore loans | 66.89% | 79.50% | 93.31% |
| account for whole bank loans | 6.74% | 4.34% | 2.72% |
| reserves for offshore bad loans | 20.10 | 13.30 | 11.50 |
| reserve coverage ratio | 35.99% | 27.90% | 30.19% |

After the Asian financial crisis, the offshore business of domestic Banks was greatly affected. In 1999, the central bank decided to stop the offshore asset business. The bank has made timely adjustments to the offshore business, and has taken various measures such as clearing and reducing loans, transforming and activating the stock of assets. As of December 31, 2001, the balance of offshore loans was compressed into RMB 4.082 billion, and the balance of non-performing assets was calculated as RMB 3.446 billion according to one or two inactive statistics, with a non-performing ratio of 84.42%.According to the statistics of five levels, the balance of non-performing assets is equivalent to 3.09 billion yuan, and the non-performing asset ratio is 93.31%.Although offshore loans accounted for only 2.91% of the total bank loans, but its recovery still has a high risk. From 1998 to 2001, the total amount of non-performing offshore loans has been written off to the equivalent of 1.109 billion yuan.

FIG. 12

METHOD AND DEVICE FOR POSITIONING TABLE IN PDF DOCUMENT

CROSS-REFERENCE TO RELATED APPLICATION

This application claims the benefit of Chinese Patent Application No. 201810253203.X, filed Mar. 26, 2018 with State Intellectual Property Office, the People's Republic of China, the entire content of which is incorporated by reference herein.

TECHNICAL FIELD

The present application relates to the technical field of data processing, and particularly, relates to a method and an electronic device for positioning a table in a PDF document.

BACKGROUND

A PDF document is based on a PostScript language image model, and for any printer, the PDF may faithfully reproduce every character, color and image of the manuscript. Due to the inherent feature that the PDF is irrelevant to the operating system platform, PDF is the most widely used ideal document format for electronic document distribution and digital information dissemination.

Although the PDF document may accurately display the layout, the structural information in the PDF, such as the position information of a table, has not been effectively recorded and stored, resulting in difficulty in restoring the table information in the PDF. Chinese patent application with the publication number CN105589841A provides a method for identifying a table in a PDF document, which uses a title feature and a table line feature to perform table positioning, if there is only a suspected table line, a full line table is firstly detected by using a line set and a row set, and then a three-line table is detected; if there is only a suspected table title, the table is identified by using an area growing method based on the table title and the row set; and if there is neither the suspected table line nor the table title, it is determined that the page has no table. The method focuses on use of the title feature and the table line feature for table positioning. In practice, only a part of tables in the PDF document that contains the title or table line features may be identified. However, the tables without explicit table titles and table lines cannot be identified effectively. Chinese patent application with the publication number CN107622230A provides another table analysis method. The method firstly converts a specified page into a grayscale image to obtain the data part therein and store the same in a two-dimensional array, and then identifies the table area based on an image projection method. This method converts the PDF document into an image for processing, on one hand, it takes a long time to convert PDF stream information into the image and process image data, and it is difficult to meet the requirements for real-time online processing; and on the other hand, a part of color information and character stream information are lost after the page is converted into to the grayscale image, thus affecting the accuracy of the table identification.

SUMMARY

The objective of the present application is to provide a method and a device for positioning a table in a PDF document, in order to overcome the defects of relatively poor table identification accuracy of the existing methods.

In order to fulfill the above objective, the embodiments of the present application provide the following technical solutions:

In one aspect, an embodiment of the present application provides a method for positioning a table in a PDF document performed at an electronic device, including the following steps:

receiving the PDF document containing the table;

extracting character information and line information from vector stream information of the PDF document; and positioning a table area in the PDF document according to the extracted character information and line information, wherein the PDF document includes at least one of a quasi full-line table and a quasi non-line table, wherein in the quasi full-line table each cell is surrounded by at least three table lines, and in the quasi non-line table, one or more cells are surrounded by fewer than three table lines.

When the PDF document includes only the quasi non-line table, the step of positioning the quasi non-line table includes:

clustering adjacent characters into a text block according to a character stream sequence and a character interval, and clustering the text blocks belonging to the same row into a text row; and using the text rows or a combination of the text rows and lines in the PDF document as an initial set of elements for positioning the quasi non-line table, and determining a quasi non-line table area based on the initial set of elements and in accordance with the text rows and the text blocks in the text rows.

When the PDF document includes the quasi full-line table and the quasi non-line table at the same time, the step of positioning the quasi full-line table includes: according to a strategy of combining intersecting or not intersecting but adjoining lines into a set of lines, combining all lines in the PDF document to obtain one or more sets of lines, and using the maximum bounding rectangle of each set of lines as a quasi full-line table area; and the step of positioning the quasi non-line table includes: clustering adjacent characters into a text block according to a character stream sequence and a character interval, and clustering the text blocks belonging to the same row into a text row; and after removing the quasi full-line table area, using the remaining text rows or a combination of the text rows and lines in the PDF document as an initial set of elements for positioning the quasi non-line table, and determining a quasi non-line table area based on the initial set of elements and in accordance with the text rows and the text blocks in the text rows.

In another aspect, an embodiment of the present application provides a device for positioning a table in a PDF document, including:

a PDF document receiving module, configured to receive the PDF document containing the table;

a character and line extraction module, configured to extract character information and line information from vector stream information of the PDF document; and a table area positioning module, configured to position a table area in the PDF document according to the extracted character information and line information, wherein the PDF document includes at least one of a quasi full-line table and a quasi non-line table, wherein in the quasi full-line table, each cell is surrounded by at least three table lines, and in the quasi non-line table, one or more cells are surrounded by fewer than three table lines.

When the PDF document includes only the quasi non-line table, the table area positioning module includes a clustering module and a quasi non-line table positioning module; wherein, the clustering module is configured to cluster adjacent characters into a text block according to a character stream sequence and a character interval, and cluster the text blocks belonging to the same row into a text row; and the quasi non-line table positioning module is configured to use the text rows or a combination of the text rows and lines in the PDF document as an initial set of elements for positioning the quasi non-line table, and determine a quasi non-line table area based on the initial set of elements and in accordance with the text rows and the text blocks in the text rows.

In another aspect, an embodiment of the present application simultaneously provides a non-transitory computer readable storage medium including computer readable instructions, wherein a processor executes the operations in the method of the embodiment of the present application when the computer readable instructions are executed.

In another aspect, an embodiment of the present application simultaneously provides an electronic equipment, including: a memory, configured to store program instructions; and a processor, connected with the memory, and configured to execute the program instructions in the memory to implement the steps of the method in the embodiment of the present application.

Compared with the prior art, the present application has the advantages that the method and the device in the present application perform table area positioning based on all lines and text blocks in a page, no matter a quasi full-line table or a quasi non-line table in the PDF document can be accurately positioned; compared with the methods in the prior arts adopting images and the methods based on table line and title positioning, the accuracy pf the table area positioning is greatly improved, and it creates a good foundation for the subsequent accurate analysis of table information. Moreover, with the present application, the positioning speed is higher, and the online real-time processing requirements can be greatly satisfied,

BRIEF DESCRIPTION OF THE DRAWINGS

In order to illustrate the technical solutions in the embodiments of the present application more clearly, a brief introduction will be made below to the drawings required in the embodiments. It should be understood that the drawings below only show some embodiments of the present application and should not be regarded as limit to the scope, and other relevant drawings could be obtained based on these drawings by those of ordinary skill in the art without any creative efforts.

FIG. 3 is an original PDF document.

FIG. 4 is a schematic diagram after text blocks are merged according to a character stream sequence and a character interval in the PDF shown in FIG. 3 according to some embodiments of the present application.

FIG. 5 is a schematic diagram after text rows are merged according to text blocks in the PDF according to some embodiments of the present application.

FIG. 6 is a schematic diagram after original path information is extracted from vector stream from a PDF document according to some embodiments of the present application.

FIG. 8 is a schematic diagram after a non-line table area is corrected in a step of positioning a non-line table area in the PDF according to some embodiments of the present application.

FIG. 9 is a schematic diagram of alignment of text rows of a table according to some embodiments of the present application.

FIG. 10 is a result diagram obtained by using the method as shown in FIG. 2 according to some embodiments of the present application.

FIG. 12 is a result diagram obtained by using the method as shown in FIG. 11 according to some embodiments of the present application.

DETAILED DESCRIPTION OF THE EMBODIMENTS

Figure 1:
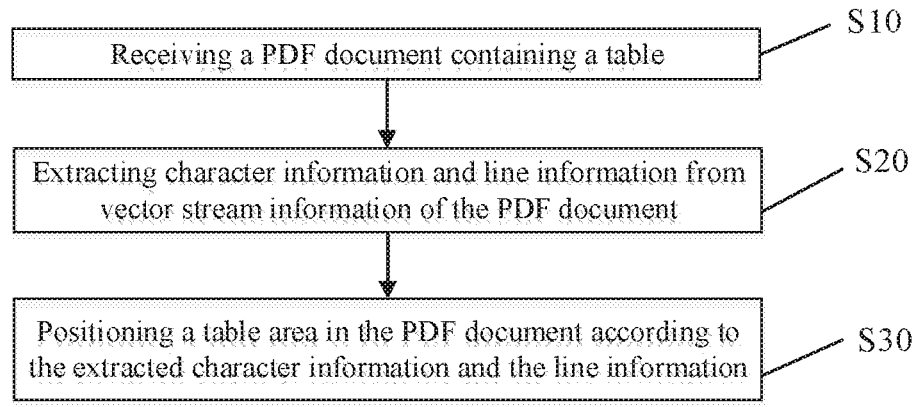
FIG. 1 is a flow diagram of a method for positioning a table in a PDF document according to some embodiments of the present application.

A clear and complete description will be made to the technical solutions in the embodiments of the present application below in combination with the drawings in the embodiments of the present application. Apparently, the embodiments described are only part of the embodiments of the present application, not all of them. Generally, the components of the embodiments of the present application described and shown in the drawings here may be arranged and designed with various different configurations. Therefore, the detailed description of the embodiments of the present application provided in the drawings below is not intended to limit the protection scope of the present application, but only indicates the selected embodiments of the present application. All other embodiments obtained by those skilled in the art without creative efforts based on the embodiments of the present application shall fall within the protection scope of the present application.

Referring to FIG. 1, a method for positioning a table in a PDF document according to this embodiment includes the following steps:

S10, receive the PDF document containing the table.

S20, extract character information and line information from the vector stream information of the PDF document.

S30, position a table area in the PDF document according to e extracted character information and line information.

The PDF document may include only a quasi full-line table, or may include only a quasi non-line table, or may include both of the quasi full-line table and the quasi non-line table at the same time, in the quasi full-line table, each cell is surrounded by at least three table lines, that is, the cell may be formed accurately by dividing table lines; and tin the quasi non-line table, one or more cells are surrounded by fewer than three table lines, and it is possible that the quasi non-line table includes no table lines at all, or includes a part of table lines.

In this embodiment, the method of the present application will be further elaborated by taking an example in which the PDF document includes both of the quasi full-line table and the quasi non-line table.

Figure 2:
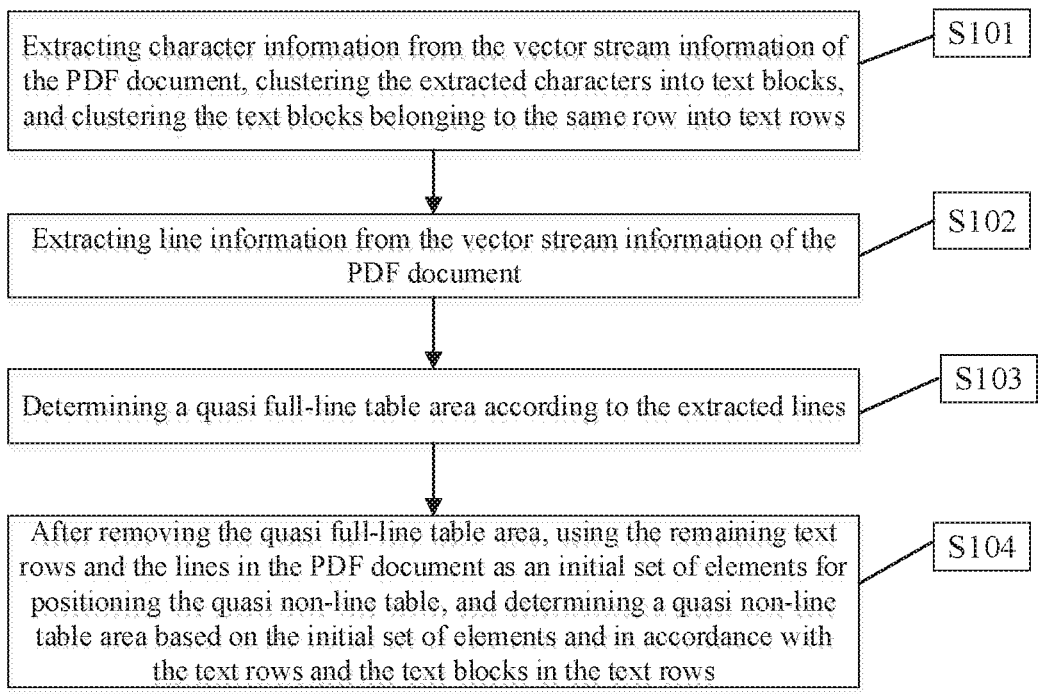
FIG. 2 is a flow diagram of another method for positioning a table in a PDF document according to some embodiments of the present application.

Referring to FIG. 2, the method shown in FIG. 2 is a method for positioning a table in a PDF document including both a quasi fill-line table and a quasi non-line table. The method shown in FIG. 2 includes the following steps:

S101, extract character information from the vector stream information of the PDF document, cluster the extracted characters into text blocks, and cluster the text blocks belonging to the same row into text rows.

In this step, as an example of a possible implementation manner, all characters in the PDF document may be extracted when the implementation is performed, and then adjacent characters are clustered into text blocks according to the character stream sequence and the character interval. The character stream sequence is also a vector stream sequence when the PDF describes the page information. Generally, the drawing sequence is from top to bottom and from left to right. Flow-ever, the PDF does not record character row or paragraph information when drawing the vector stream information. Actually, it is not enough to accurately determine whether two characters belong to the same row and the same paragraph only based on the character stream sequence; and the character interval refers to the character interval between two characters on the horizontal direction of the page, and the adjacent characters may be merged into one text block by combining the character stream sequence and the character interval at the same time. As shown in FIG. 4, the gray box area is a text block clustered according to the character stream sequence and the character interval.

Finally, the text blocks belonging to the same row are clustered into text rows, and the text blocks on the same row refer to text blocks that satisfy the demand that the vertical spacing is less than (including intersecting) a certain threshold, for example, the text blocks with vertical distances less than 0.5 times the average character height of the page. As shown in FIG. 5, only the merged text row area of some text blocks is drawn in the figure, wherein the short gray areas are the text blocks, and the long gray areas are the text rows clustered by the text blocks.

S102, extract line information from the vector stream information of the PDF document. For example, as an example of an implementable manner, line segments of table lines may be screened out from PDF vector streams, and then the screened out line segments having a closer distance and a consistent direction are merged into a line. The closer distance here means that the spacing is less than or equal to a set distance threshold, for example, the spacing may be less than or equal to an average character spacing.

The table lines in the PDF document are stored by using the vector stream path information and have the characteristics of being "fine, flat and long", according to these characteristics, the line segments satisfying the requirements in the PDF vector stream may be extracted and screened out, the table line in the PDF is not a complete line in the vector stream, but is composed of a plurality of line segments, therefore, it is possible to merge the screened out line segments having the closer distance and the consistent direction into an entire line, and then horizontal lines and vertical lines are selected from the obtained line according to the direction of the line. As shown in FIG. 6, line segments of different colors (represented by different color depths) are original path information extracted from the PDF vector stream information. For example, in FIG. 6, two line segments with reference signs A and B have a distance of zero, which is less than the set distance threshold, and have the consistent direction, so they are merged into a line.

S103, determine a quasi full-line table area according to the extracted line.

In implementation, all lines in the PDF document may be combined according to a strategy of combining intersecting or not intersecting but adjoining lines into a line set, that is, all lines intersecting or not intersecting but adjoining are combined into a line set, all lines extracted from the PDF document are combined to obtain one or more line sets, and the maximum bounding rectangle of each line set is taken as an area. The term non-intersecting here refers to no intersection between the lines, whether the lines are horizontal lines or vertical lines.

Since a part of box-and-line diagrams (which are graphics rather than tables, such as flow diagrams with boxes) and the text enclosed by only an external bonding box also have a complete line enveloping structure, they are not essentially table areas, so in this condition, if the areas that do not belong to the table are not removed, the positioned quasi full-line table area is inaccurate.

Therefore, in a better embodiment, it is necessary to remove such areas that do not belong to the table, that is, in all obtained areas, the areas that do not contain the features of the quasi full-line table are removed. In the remaining areas, one area is a quasi full-line table area. The method of removing the areas that do not contain the features of the quasi full-line table may be: counting the number of the horizontal lines and the vertical lines in the areas and the number of grid blocks divided by the horizontal lines and the vertical lines, and removing the areas not meeting the following conditions: the number of horizontal lines and the number of vertical lines are at least two respectively, the horizontal lines and the vertical lines have intersections, and the number of grid blocks divided by the horizontal lines and the vertical lines is at least two.

As shown in FIG. 10, after the processing in this step, if there is the quasi full-line table in the PDF document, the quasi full-line table area may be accurately positioned.

S104, use the text rows and the lines in the PDF document with the quasi full-line table area removed as an initial element set for positioning the quasi non-line table, and determine a quasi non-line table area based on the initial element set and in accordance with the text rows and the text blocks in the text rows.

As an example of an implementable manner, in implementation, the quasi non-line table may be positioned based on the initial element set and in accordance with the alignment information of the text block in the text rows, and/or the line information around the text rows so as to obtain a set containing one or more quasi non-line table areas.

Specifically, at first, the text rows that may compose the table area are found out from the initial element set, and an initial seed point set A1 is formed by all of the found text rows. The so-called text rows that may compose the table area here means, for example, that the text rows in which the number of text blocks is greater than 2 and the horizontal distances between the text blocks are greater than twice the average character width of the page (the corresponding threshold may be adjusted according to the characteristics of the PDF itself), or text rows with lines above and below, or text rows with different background colors above and below a certain text row.

Then, based on the strategy of merging the initial seed points adjacent to each other and having a distance less than, for example, twice the average character height of the PDF document (actually, the corresponding distance threshold may be adjusted according to the characteristics of the PDF itself), all initial seed points in the initial seed point set A1 are merged to obtain one or more areas, one area is one seed point, and one or more areas constitute a seed point set A2.

Figure 7:
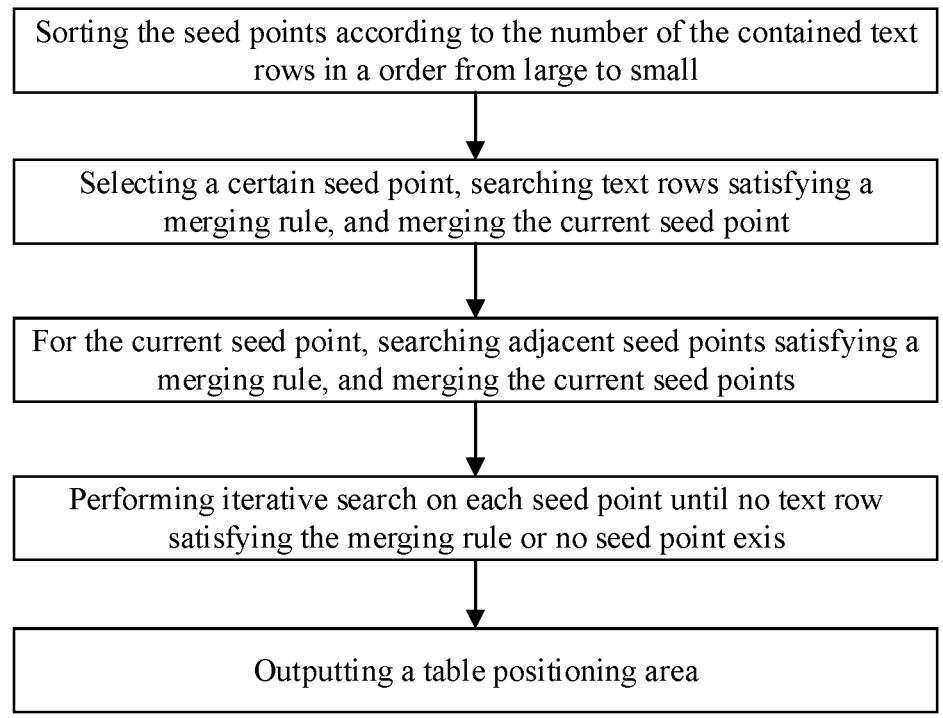
FIG. 7 is a flow diagram of downward merging seed points of a table in a step of positioning a quasi non-line table area according to some embodiments of the present application.

Then, referring to FIG. 7, the areas in the seed point set A2 are sorted according to the number of the initial seed points contained in the areas from large to small (or from small to large), and then one seed point is selected in sequence for performing text row search downward firstly and then upward, for each seed point, text rows having the text blocks satisfying column alignment or text rows having a plurality of parallel lines therebetween with distances greater than the set width threshold (for example, 0.5 times as large as the seed point area width, which may be actually adjusted according to the characteristics of the PDF itself) in the upper and lower text rows (which may be called the first merging rule) are merged with the seed point to form a new seed point; and a plurality of new seed points are obtained after traversing the whole initial element set. Then, the plurality of new seed points are compared, the adjacent new seed points are merged with distances less than a set height threshold (for example, 2 times as large as the average page height, which actually may be correspondingly adjusted according to the characteristics of the PDF itself) and having text blocks of the first and last text rows (i.e., (the last (or first) text row of the previous new seed point) and the first (or last) text block of the subsequent adjacent new seed point) satisfying the alignment relation (may be called a second merging rule), the merged area is a quasi non-line table area, and a new seed point that does not satisfy the second merging rule is also a quasi non-line table area.

It should be noted that in the search process, it is also possible to searching up firstly and then down, but the effect of searching down firstly and then up is better in practice, because the upward search of the table is easily interfered by the header row or the unit line and the header row is also mistakenly merged into the table; in the manner of merging down firstly, the text row satisfying the merging rule will further increase the number of seeds in the current seed point set, thereby being more conducive to collecting the overall structural features of the seed points, namely, improving the positioning accuracy of the non-line table area.

The difficulty in positioning the quasi non-line table area is that it is impossible to accurately position the boundary of the table area, i.e., the cut-off text row for the seed point search. Therefore, it is possible to mistakenly merge parts not belonging to the table area into the table area in practice, for example, a unit description row above a header and a comment row below the table. Therefore, in a more preferred embodiment, it also includes the step of removing unit description rows and comment rows that are merged mistakenly. If a header row or a comment row is merged mistakenly, the text row merged mistakenly may be removed through this step, and the accuracy of the positioning of the quasi non-line table area may be improved, if the header row or the comment row is not merged mistakenly, the execution result of this step is empty.

The unit description row is generally located above the table body, is often used for describing the unit information of the elements in the table, and often has a keyword "unit"; the comment row is generally located below the table body, is often used for explaining or commenting on the table, and often has a keyword "note". For the text row merged mistakenly, text row filtering may be performed by keyword matching or text block alignment information, and text block alignment means that each text block of the previous row at most intersects with one of the text blocks of the next row on the horizontal direction. As shown in FIG. 9, the long gray frame area is a text row, the short gray frame area is an aligned text block, the two text rows shown in FIG. 9 satisfy an upper and lower text block alignment strategy, and if all text blocks of upper and lower text rows do not satisfy the alignment rule or the characters in the text rows accord with a corresponding keyword matching rule, the text row area is removed from the table area. Finally, the filtered text row area is corrected, and an accurate quasi non-line table area is finally obtained. As shown in FIG. 8, the area of the green box (indicated by a thin line box) is a real table area, and the part of the red box (represented by a bold line box) is a unit description row, and the line information may be removed by keyword matching, and then the table area is corrected to obtain a more accurate quasi non-line table area as shown in FIG. 10.

Figure 11:
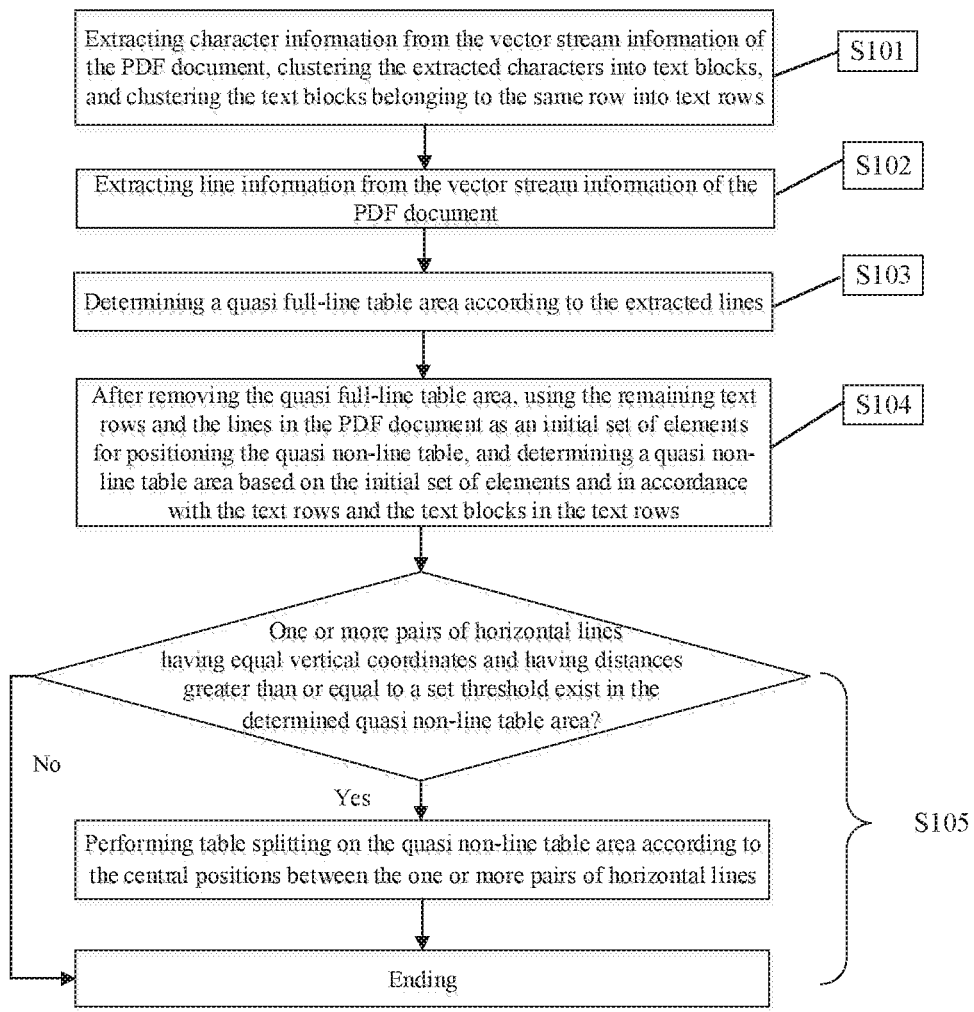
FIG. 11 is a flow diagram of another method for positioning a table in a PDF document according to some embodiments of the present application.

As shown in FIG. 10, from the viewpoint of the specific verbal contents in the quasi non-line table, the quasi non-line table may also be considered as two parallel quasi non-line tables, because both the rows and the columns of the two tables are of an alignment structure, so they are positioned as one quasi non-line table area according to the above method, however, as the two tables are similar in structure but different in contents, it is also possible to position two tables, that is to say, the quasi non-line table shown in FIG. 10 may be positioned as one quasi non-line table area or two quasi non-line table areas. Therefore, in another embodiment, as shown in FIG. 11, the above method further includes the following steps:

S105, if one or more pairs of horizontal lines having equal vertical coordinates and having distances greater than or equal to a set threshold (e.g., 5 times as large as the average character width of the page, which may be correspondingly adjusted according to the characteristics of the PDF itself), perform table splitting on the quasi non-line table area according to the central positions between the one or more pairs of horizontal lines to obtain two or more quasi non-line table areas.

As shown in FIG. 12, an upper table area in FIG. 10 is accurately divided into two quasi non-line table areas after this step.

Figure 13:
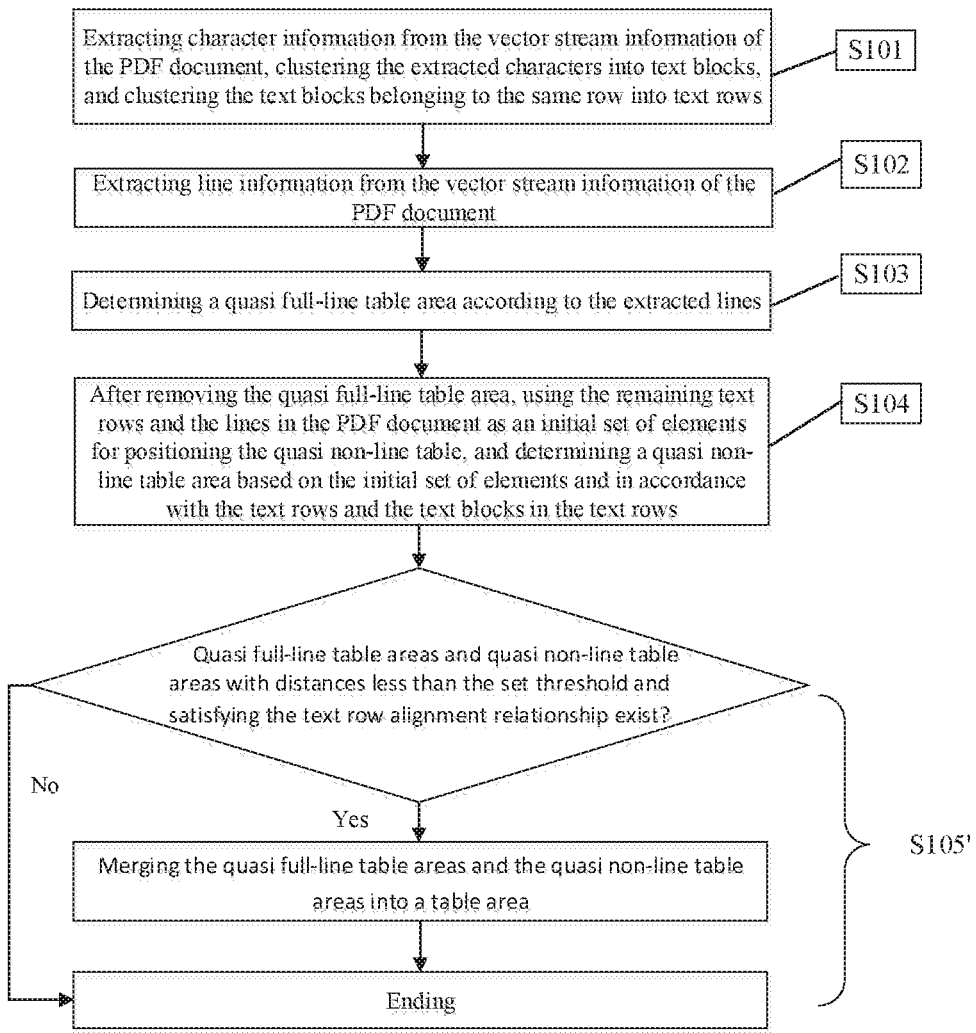
FIG. 13 is a flow diagram of another method for positioning a table in a PDF document according to some embodiments of the present application.

Since the quasi full-line table areas surrounding by complete table lines and the quasi non-line table areas not surrounding by the complete table lines exist at the same time in a part of table areas, that is, the a complete table is composed of the quasi full-line table areas and the quasi non-line table areas together, in order to take this case into consideration, the quasi full-line table areas and the quasi non-line table areas should be merged in this case to achieve more accurate table area positioning. Therefore, as shown in FIG. 13, in another embodiment, the method for positioning the table in the PDF document further includes the following steps:

S105', check all quasi full-line table areas and quasi non-line table areas, and if the quasi full-line table areas and the quasi non-line table areas with distances less than the set threshold (for example, twice as large as the average character height of the page, which may be a correspondingly adjusted according to the characteristics of the PDF itself) and satisfying the text row alignment relationship, merge the quasi full-line table areas and the quasi non-line table areas into a table area. The so-called text row alignment here means that the last line of text of the upper table area and the text block of the first row of texts of the lower table area satisfy upper and lower alignment, that is, each text block of the last row of the upper table area at most has an intersection with one text block in the first row of texts of the lower table area on the horizontal direction.

Of course, if there is no such situation, all quasi full-line table areas and quasi non-line table areas are checked and nothing else is performed.

It should be noted that if the PDF document only includes the quasi full-line table, the method for positioning the table in the PDF document does not include the step of positioning the quasi non-line table (i.e., step S104) and the step of merging the quasi full-line table area with the quasi non-line table area (i.e., step S105).

It should be noted that the PDF document only includes the quasi non-line table, the method for positioning the table in the PDF document does not include the step of positioning the quasi full-line table (i.e., step S103) and the step of merging the quasi full-line table area with the quasi non-line table area (i.e., step S105), and at this time, the initial element set in step S104 is directly composed of the text rows or the combination of the text rows and the lines in the PDF document. In addition, if no line is in the PDF document at this time, the step of extracting the line (i.e., step S102) is not included.

The method described in any of the embodiments can position the table area more accurately than the prior art, the positioning speed is high, and the online real-time processing requirements are satisfied.

Figure 14:
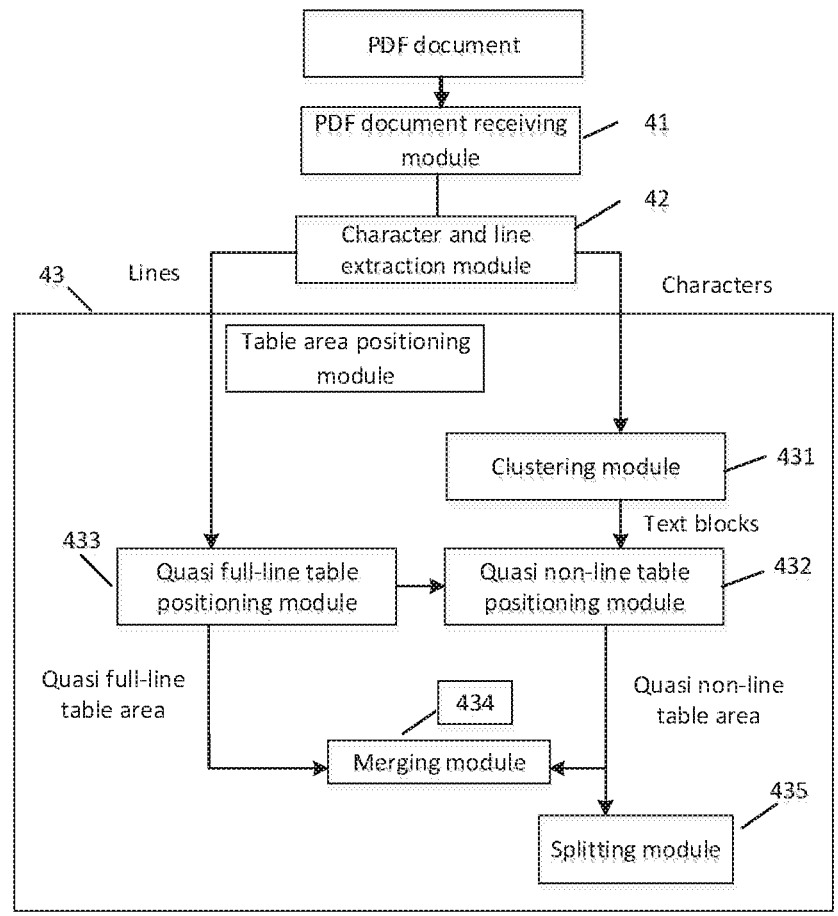
FIG. 14 is a diagram of functional modules of a device for positioning a table in a PDF document according to some embodiments of the present application.

Based on the same inventive concept, this embodiment further provides a device for positioning a table in a PDF document. For details that are not described in this embodiment of the device, reference is made to the corresponding contents in the foregoing embodiment of the positioning method. Referring to FIG. 14, the device for positioning the table in the PDF document provided also in this embodiment includes:

a PDF document receiving module 41, configured to receive the PDF document containing the table;

a character and line extraction module 42, configured to extract character information and line information from the vector stream information of the PDF document; and a table area positioning module 43, configured to position a table area in the PDF document according to the extracted character information and line information.

When the PDF document only includes the quasi non-line table, the table area positioning module 43 includes a clustering module 431 and a quasi non-line table positioning module 432; wherein, the clustering module 431 is configured to cluster adjacent characters into text blocks according to a character stream sequence and a character interval, and cluster the text blocks belonging to the same row into text rows; and the quasi non-line table positioning module 432 is configured to use the text rows or the combination of the text rows and lines in the PDF document as an initial element set for positioning the quasi non-line table, and determine a quasi non-line table area based on the initial element set and in accordance with the text rows and the text blocks in the text rows, When the PDF document only includes the quasi full-line table, the table area positioning module 43 includes a quasi full-line table positioning module 433, configured to, according to the strategy of combining intersecting or not intersecting but adjoining lines into a set of lines, combine all lines in the PDF document to obtain one or more sets of lines, and use the maximum bounding rectangle of each set of lines as a quasi full-line table area.

When the PDF document includes the quasi full-line table and the quasi non-line table at the same time, the table area positioning module 43 includes the clustering module 431, the quasi non-line table positioning module 432 and the quasi full-line table positioning module 433, and the quasi non-line table positioning module is configured to use the text rows or the combination of the text rows and lines in the PDF document with the quasi full-line table area removed as an initial element set for positioning the quasi non-line table, and determine a quasi non-line table area based on the initial element set and in accordance with the text rows and the text blocks in the text rows.

Optionally, the table area positioning module 43 may further include a merging module 434 configured to, when a quasi full-line table area and a quasi non-line table area having a distance less than a set threshold and satisfying a text row alignment relationship exist, merge the quasi full-line table area and the quasi non-line table area into a table area.

Optionally, the table area positioning module 43 may further include a splitting module 435 configured to, when it is determined that one or more pairs of horizontal lines having equal vertical coordinates and having distances greater than or equal to a set threshold exist in the determined quasi non-line table area, splitting the quasi non-line table area according to the central positions between the one or more pairs of horizontal lines.

In one embodiment, the quasi full-line table positioning module 433 may determine the quasi full-line table area in the following manner: according to the strategy of combining intersecting or not intersecting but adjoining lines into a set of lines, combining all lines in the PDF document to obtain one or more sets of lines, using the maximum bounding rectangle of each set of lines as a quasi full-line table area, and removing the areas containing no table feature, taking each remaining area as a quasi full-line table area.

In one embodiment, the quasi non-line table positioning module 432 may include the following sub-modules:

An initial seed point collection sub-module, configured to find out text rows that may compose the table area from the initial element set and to form an initial seed point set A1 by all found text rows.

An initial seed point merging sub-module, configured to combine all initial seed points in the initial seed point set A1 according to the strategy of merging the adjacent initial seed points having distances less than a set distance threshold to obtain one or more areas, wherein one area is one seed point, and one or more areas form a seed point set A1

An quasi non-line table positioning sub-module, configured to, sort areas in the seed point set A2 according to the number of the initial seed points contained in the areas from large to small, then select one seed point in sequence for performing text row search downward firstly and then upward, for each seed point, merge text rows having the text blocks satisfying column alignment or the text rows having a plurality of parallel lines therebetween with distances greater than the set width threshold (for example, 0.5 times as large as the seed point area width, which may be actually adjusted according to the characteristics of the PDF itself) in the upper and lower text rows (which may be called the first merging rule) with the seed point to form a new seed point; and traverse the whole initial element set to obtain a plurality of new seed points. Then, the plurality of new seed points are compared, the adjacent new seed points with distances less than a set height threshold (for example, 2 times as large as the average page height, which may be correspondingly adjusted according to the characteristics of the PDF itself) and having text blocks of the first and last text rows satisfying the alignment relation (which may be called a second merging rule), the merged area is a quasi non-line table area, and a new seed point that does not satisfy the second merging rule is also a quasi non-line table area.

An quasi non-line table correction sub-module, configured to perform text row filtering via keyword matching or text block alignment information to delete unit description rows or comment rows that are merged mistakenly in the initial non-line frame area determining sub-module to obtain a corrected quasi non-line table area.

Figure 15:
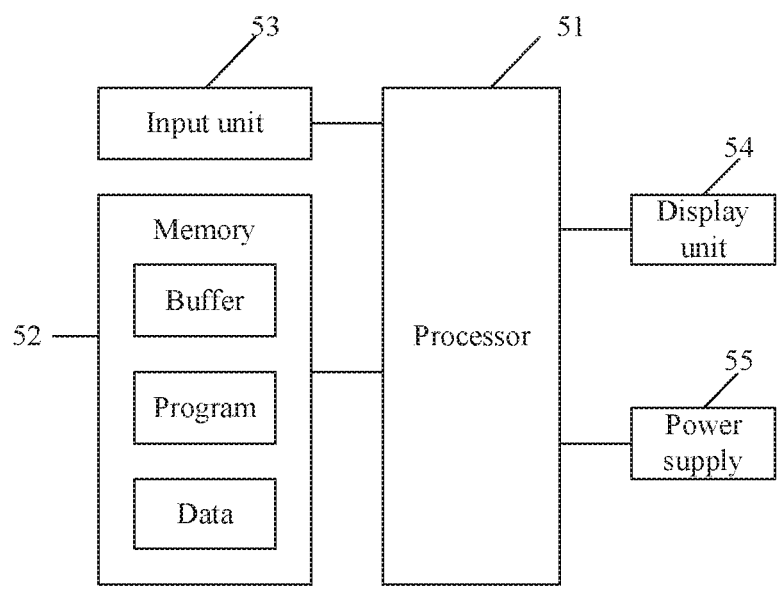
FIG. 15 is a structure block diagram of electronic equipment according to some embodiments of the present application.

As shown in FIG. 15, this embodiment simultaneously provides electronic equipment. The electronic equipment may include a processor 51 and a memory 52, wherein the memory 52 is coupled to the processor 51. It should be noted that the figure is exemplary, and the structure may also be supplemented or replaced with other structure to realize data extraction, chart redrawing, communication or other functions.

As shown in FIG. 15, the electronic equipment may further include an input unit 53, a display unit 54 and a power supply 55. It should be noted that the electronic equipment does not necessarily include all components shown in FIG. 15. Moreover, the electronic equipment may further include components not shown in FIG. 15, referring to the prior art.

The processor 51 is also referred to as a controller or an operation control sometimes, and may include a microprocessor or other processor devices and/or logic devices. The processor 51 receives an input and controls the operation of each component of the electronic equipment.

The memory 52, for example, may be one or more of a cache, a flash memory, a hard driver, a mobile medium, a volatile memory, a non-volatile memory and other proper devices, and may store configuration information of the processor 51, instructions executed by the processor 51, recorded table data and other information. The processor 51 may execute a program stored in the memory 52 to implement information storage or processing or the like. In one embodiment, the memory 52 further includes a buffer memory, i.e., a buffer, to store intermediate information.

The input unit 53, for example, is configured to provide a to-be-processed PDF document for the processor 51. The display unit 54 is configured to display various state diagrams in a display processing process. The display unit, for example, may be a liquid crystal display (LCD), but the present application is not limited thereto. The power supply 55 is configured to supply power to the electronic equipment.

An embodiment of the present application further provides a computer readable instruction, wherein when the instruction is executed in the electronic equipment, the program enables the electronic equipment to execute the operation steps included in the method of the present application.

An embodiment of the present application further provides a storage medium storing a computer readable instruction, wherein the computer readable instruction enables the electronic equipment to execute the operation steps included in the method of the present application.

It should be understood that, in various embodiments of the present application, the serial numbers of the above-mentioned steps do not mean the execution sequence. The execution sequence of the steps should be determined based on the functions and inherent logics thereof, but should not constitute any limitation to the implementation process of the embodiment of the present application.

Those of ordinary skill in the art may realize that the units and algorithm steps of each example described in combination with the embodiments disclosed in the present disclosure may be implemented by electronic hardware, computer software or the combination of computer software and the electronic hardware. In order to clearly describe the interchangeability of hardware and software, the composition and steps of each example are described generally above according to the functions. Whether these functions are executed by hardware or software depends on a specific application and design constraint conditions of the technical solution. Professionals may use different methods to implement the described functions for each specific application, but such implementation should not be considered as going beyond the scope of the present application.

Those skilled in the art may clearly understand that, for the purpose of convenience and briefness in description, for the specific working processes of the above-described systems, devices and units, reference could be made to the corresponding processes in the embodiments of the aforementioned methods, and description is not repeated here.

In the several embodiments provided in the present application, it should be understood that the disclosed systems, devices and methods may be realized in other modes. For example, the embodiments of the above-described devices are only exemplary, for example, the division of the units is only a logic function division, other division modes may be adopted in practice, e.g., a plurality of units or components may be combined or integrated in another system, or some characteristics may be omitted or not executed. In addition, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is to say, the components may be positioned at one place or may also be distributed on a plurality of network units. The objectives of the solutions of the embodiments of the present application may be fulfilled by selecting part of or all of the units according to actual needs.

When the integrated unit is realized in the form of a software functional unit and sold or used as an independent product, the integrated unit may be stored in a non-transitory computer readable storage medium. Based on such an understanding, the technical solution of the present application substantially, or all or part of the present application making contribution to the prior art, or a part or all of the technical solution may be embodied in the form of a software product, and the computer software product is stored in a storage medium, which includes a plurality of instructions enabling computer equipment (which may be a personal computer, a server, or network equipment or the like) to execute all of or part of the steps in the methods of the embodiments of the present application. The aforementioned storage medium includes: various media capable of storing program codes, such as a U disk, a mobile hard disk, a read-only memory (ROM, Read-Only Memory), a random access memory (RAM, Random Access Memory), a magnetic disk or an optical disk.

The above description is the specific embodiments of the present application only, but the scope of the present application is not limited thereto, any skilled who is familiar with this art could readily think of variations or substitutions within the disclosed technical scope of the present application, and these variations or substitutions shall fall within the scope of the present application. Thus, the scope of the present application shall be subjected to the scope of the claims.

The invention claimed is:

1. A method for positioning a table in a PDF document performed at electronic device, comprising the following steps:
receiving, by the electronic device, the PDF document containing the table;
extracting, by the electronic device, character information and line information from vector stream information of the PDF document; and
positioning, by the electronic device, a table area in the PDF document according to the extracted character information and line information,
wherein the PDF document inputted into the electronic device comprises at least one of a quasi full-line table and a quasi non-line table, wherein in the quasi full-line table, each cell is surrounded by at least three table lines, and in the quasi non-line table, one or more cells are surrounded by fewer than three table lines,
wherein the quasi non-line table is positioned by:
clustering adjacent characters into a text block according to character stream sequence and character interval, and clustering the text blocks belonging to the same row into a text row; and
using the text rows or a combination of the text rows and the lines in the PDF document as an initial set of elements for the quasi non-line table positioning, and performing the quasi non-line table positioning based on the initial set of elements and in accordance with the alignment information of the text blocks in the text rows, and/or the line information around the text rows, so as to obtain one or more quasi non-line table areas; and
the quasi full-line table is positioned by:
combining all lines in the PDF document to obtain one or more sets of lines according to a strategy of combining intersecting or not intersecting but adjoining lines into a set of lines, and using the maximum outer bounding rectangle of each set of lines as a quasi full-line table area.

2. The method according to claim 1, wherein the step of positioning the quasi non-line table comprises:
clustering, by the electronic device, adjacent characters into a text block according to character stream sequence and character interval, and clustering the text blocks belonging to the same row into a text row; and
after removing the quasi full-line tables area, using, by the electronic device, the remaining text rows or a combination of the text rows and the lines in the PDF document as an initial set of elements for positioning the quasi non-line table, and determining a quasi non-line table area based on the initial set of elements and in accordance with the text rows and the text blocks in the text rows.

3. The method according to claim 2, further comprising:
when there are a quasi full-line table area and a quasi non-line table area having a distance less than a set threshold and satisfying a text row alignment relationship, merging, by the electronic device, the quasi full-line table area and the quasi non-line table area into one table area.

4. The method according to claim 1, wherein the step of performing quasi non-line table positioning based on the initial set of elements and in accordance with the alignment information of the text blocks in the text rows, and/or the line information around the text rows comprises:
finding, by the electronic device, the text rows that may compose a table area from the initial set of elements and combining all found text rows into an initial set of seed points A1;
combining, by the electronic device, all initial seed points in the initial set of seed points A1 according to a strategy of merging the adjacent initial seed points having a distance less than a set distance threshold into one seed point, to obtain a set of seed points A2 containing one or more seed points;
sorting, by the electronic device, the seed points in the set of seed points A2 according to the number of the initial seed points contained in the set of seed points A2 in an order from large to small or from small to large;
selecting, by the electronic device, in sequence, one seed point to perform text row search in a manner of first downward and then upward or first upward and then downward;
for each seed point, in the upper and lower text rows, merging, by the electronic device, the text rows having the text blocks satisfying column alignment or the text rows having a plurality of parallel lines therebetween with the distances greater than a set width threshold with the seed point to form a new seed point;
traversing, by the electronic device, the whole initial set of elements to obtain a plurality of new seed points; and
comparing, by the electronic device, the plurality of new seed points, and merging the adjacent new seed points with distances less than a set height threshold and having text blocks of the first and last text rows satisfying the alignment relationship to finally obtain one or more quasi non-line table areas.

5. The method according to claim 1, wherein the step of performing quasi non-line table positioning based on the initial set of elements and in accordance with the alignment information of the text blocks in the text rows, and/or the line information around the text rows further comprises:
filtering, by the electronic device, the text rows by keyword matching or text block alignment information to delete description rows or comment rows which are mistakenly merged into the quasi non-line table area to obtain a corrected quasi non-line table area.

6. The method according to claim 1, wherein the step of positioning the quasi non-line table further comprises:
when it is determined that one or more pairs of horizontal lines having equal vertical coordinates and having distances greater than or equal to a set threshold exist in the determined quasi non-line table area, splitting, by the electronic device, the quasi non-line table area according to the central positions between the one or more pairs of horizontal lines.

7. The method according to claim 1, wherein the step of positioning the quasi full-line table further comprises:
removing, by the electronic device from all obtained areas, the areas not containing any feature of the quasi full-line table, and taking each remaining area as a quasi full-line table area.

8. The method according to claim 7, wherein the step of removing the areas not containing any feature of the quasi full-line table comprises:
   counting, by the electronic device, the number of horizontal lines and vertical lines in each area and the number of grid blocks divided by the horizontal lines and the vertical lines, and removing the areas that do not meet the following conditions:
   the number of the horizontal lines and the number of the vertical lines are at least two respectively, the horizontal lines and the vertical lines have intersections, and the number of the grid blocks divided by the horizontal lines and the vertical lines is at least two.

9. The method according to claim 1, wherein the step of extracting the line information from vector stream information of the PDF document comprises:
   screening out, by the electronic device, line segments of table lines from PDF vector stream; and
   merging, by the electronic device, the line segments having distances less than a set distance threshold and having a consistent direction into a line.

10. An electronic device for positioning a table in a PDF document, comprising:
   one or more processors;
   memory coupled to the one or more processors; and
   a plurality of computer instructions stored in the memory, wherein the computer instructions, when executed by the one or more processors, cause the electronic device to perform operations including:
      receiving, by the electronic device, the PDF document containing the table;
      extracting, by the electronic device, character information and line information from vector stream information of the PDF document; and
      positioning, by the electronic device, a table area in the PDF document according to the extracted character information and line information,
      wherein the PDF document inputted into the electronic device comprises at least one of a quasi full-line table and a quasi non-line table, wherein in the quasi full-line table, each cell is surrounded by at least three table lines, and in the quasi non-line table, one or more cells are surrounded by fewer than three table lines,
   wherein the quasi non-line table is positioned by:
      clustering adjacent characters into a text block according to character stream sequence and character interval, and clustering the text blocks belonging to the same row into a text row; and
      using the text rows or a combination of the text rows and the lines in the PDF document as an initial set of elements for the quasi non-line table positioning, and performing the quasi non-line table positioning based on the initial set of elements and in accordance with the alignment information of the text blocks in the text rows, and/or the line information around the text rows, so as to obtain one or more quasi non-line table areas; and
   the quasi full-line table is positioned by:
      combining all lines in the PDF document to obtain one or more sets of lines according to a strategy of combining intersecting or not intersecting but adjoining lines into a set of lines, and using the maximum outer bounding rectangle of each set of lines as a quasi full-line table area.

11. The electronic device according to claim 10, wherein the step of positioning the quasi non-line table further comprises:
   when it is determined that one or more pairs of horizontal lines having equal vertical coordinates and having distances greater than or equal to a set threshold exist in the determined quasi non-line table area, splitting, by the electronic device, the quasi non-line table area according to the central positions between the one or more pairs of horizontal lines.

12. The electronic device according to claim 10, wherein the step of positioning the quasi full-line table further comprises:
   removing, by the electronic device from all obtained areas, the areas not containing any feature of the quasi full-line table, and taking each remaining area as a quasi full-line table area.

13. The electronic device according to claim 10, wherein the step of extracting the line information from vector stream information of the PDF document comprises:
   screening out line segments of table lines from PDF vector stream; and
   merging the line segments having distances less than a set distance threshold and having a consistent direction into a line.

14. A non-transitory computer readable storage medium comprising computer readable instructions that, when executed by a processor of an electronic device, cause the electronic device to perform operations including:
   receiving, by the electronic device, the PDF document containing the table;
   extracting, by the electronic device, character information and line information from vector stream information of the PDF document; and
   positioning, by the electronic device, a table area in the PDF document according to the extracted character information and line information,
   wherein the PDF document inputted into the electronic device comprises at least one of a quasi full-line table and a quasi non-line table, wherein in the quasi full-line table, each cell is surrounded by at least three table lines, and in the quasi non-line table, one or more cells are surrounded by fewer than three table lines,
   wherein the quasi non-line table is positioned by:
      clustering adjacent characters into a text block according to character stream sequence and character interval, and clustering the text blocks belonging to the same row into a text row; and
      using the text rows or a combination of the text rows and the lines in the PDF document as an initial set of elements for the quasi non-line table positioning, and performing the quasi non-line table positioning based on the initial set of elements and in accordance with the alignment information of the text blocks in the text rows, and/or the line information around the text rows, so as to obtain one or more quasi non-line table areas; and
   the quasi full-line table is positioned by:
      combining all lines in the PDF document to obtain one or more sets of lines according to a strategy of combining intersecting or not intersecting but adjoining lines into a set of lines, and using the maximum outer bounding rectangle of each set of lines as a quasi full-line table area.

* * * * *